(12) United States Patent
Langer

(10) Patent No.: US 7,590,840 B2
(45) Date of Patent: Sep. 15, 2009

(54) METHOD AND SYSTEM FOR AUTHORIZING CLIENT DEVICES TO RECEIVE SECURED DATA STREAMS

(76) Inventor: Randy Langer, 3785 Celeste Ct., SE., Port Orchard, WA (US) 98366

( * ) Notice: Subject to any disclaimer, the term of this patent is extended or adjusted under 35 U.S.C. 154(b) by 914 days.

(21) Appl. No.: 10/949,963

(22) Filed: Sep. 24, 2004

(65) Prior Publication Data

US 2005/0071631 A1 Mar. 31, 2005

Related U.S. Application Data

(60) Provisional application No. 60/506,707, filed on Sep. 26, 2003.

(51) Int. Cl.
*H04L 9/00* (2006.01)
(52) U.S. Cl. .................... 713/156; 726/10
(58) Field of Classification Search ............ 726/10; 713/156
See application file for complete search history.

(56) References Cited

U.S. PATENT DOCUMENTS

| | | | |
|---|---|---|---|
| 6,260,142 B1 * | 7/2001 | Thakkar et al. | 713/158 |
| 6,801,998 B1 * | 10/2004 | Hanna et al. | 713/155 |
| 6,950,809 B2 * | 9/2005 | Dahan et al. | 705/76 |
| 2003/0191953 A1 * | 10/2003 | Pandit et al. | 713/189 |

* cited by examiner

*Primary Examiner*—Kambiz Zand
*Assistant Examiner*—Aubrey H Wyszynski
(74) *Attorney, Agent, or Firm*—Stolowitz Ford Cowger LLP

(57) ABSTRACT

A method and system for authorizing client devices to receive secured data streams through the use of digital certificates embedded in the client devices. A freely distributed cryptographically signed group file with an embedded expiration date is associated with each individual digital certificate. A single group file can be associated with more than one digital certificate but each digital certificate is associated with a single group file. The group file contains cryptographic keys that can be used to decrypt a section of the digital certificate revealing a set of client keys. The client keys are then used to encrypt a program key which are then sent back to the client device. When the client device requests a specific data stream or digital content, an issuance timestamp associated with the content is compared to the expiration date in the group file. If the issuance timestamp is after the expiration date, the client device is declined. If the issuance timestamp is before the expiration date, the requested content, encrypted utilizing the program key, is sent to the client device.

33 Claims, 10 Drawing Sheets

METHOD AND SYSTEM FOR AUTHORIZING CLIENT DEVICES TO RECEIVE SECURED DATA STREAMS

CROSS-REFERENCE TO RELATED APPLICATIONS

This application claims benefit of U.S. Provisional Application No. 60/506,707, filed Sep. 26, 2003, entitled "Multimedia Secure Streaming Server," the contents of which are incorporated herein by reference.

FIELD OF THE INVENTION

The present invention relates generally to computer network device authentication and key exchange. More particularly, the present invention relates to authentication of a device by utilizing a digital certificate stored on the device but without the need to access a central validation authority at the time of authentication.

BACKGROUND OF THE INVENTION

When high-value digital content, such as entertainment media content, is distributed, that content must be protected against unauthorized distribution and use to protect the rights of the copyright holder. Encryption is often used as a method of protecting content against unauthorized use as only those users or devices which have the proper decryption key are able to utilize the encrypted content. This creates the issue of how to get the proper key only to those users or devices which are allowed to utilize the content. The process of determining which users or devices should be given the key is called authentication and the process of securely giving the key to the device that will be decrypting the content is called a key exchange.

Authentication over a network is an important part of security for systems that allow client devices to access resources on the network. Authentication is generally accomplished by verifying something a user knows, such as a password, something a user is, such as a fingerprint, or something a user has, such as a smart-card.

As an example, a typical login to a computer system may rely only on something that the user knows. This authentication process usually consists of a user name and password being entered by the user. It is becoming more common, however, to require a fingerprint or retinal scan as a part of the login process which adds something that the user is. This type of authentication, which requires a user to enter a password or biometric information each time the want to access protected content, is undesirable for entertainment content because of the "hassle-factor" for the user.

Using the last type of authentication, something the user has, and embedding that something inside of a client device eliminates this "hassle-factor." The mere fact that the user possesses the device is enough to authorize the user to receive the content. Extra security requirements are necessary to secure the data within the device from attack, but the extra requirements are generally deemed worthwhile for an entertainment application as it is much more convenient for the user. The client device may have secret data (e.g. secret keys shared with the authenticating server) which must never be revealed, as well as non-secret but sensitive data (e.g. the authenticating server's public key) which must be stored in a tamper-proof way.

One common type of data stored in a client device for authentication purposes is referred to as a digital certificate. Typically a digital certificate contains data that has been cryptographically signed to make it very difficult to tamper with the content of the certificate without detection. The digital certificate can be sent to a local server as evidence that the device should be authenticated. In most prior art, the local server would then send this certificate to a central validation authority which knows the secret for verifying that the certificate has not been tampered with. This creates a problem for many applications where it is either not possible or it is too time consuming to connect to the central validation server. In other cases, the local server may keep a cache of valid certificates which can be compared to the digital certificate that is received from the client device. Because in most cases the digital certificate in each client device is unique, this creates a data management issue due to the number of potential certificates that might need to be cached to have the proper certificate when a particular authorized unit is purchased by the user. In yet another approach, the local server knows the secret which is required to validate the certificate. This can create a much less secure environment if the local server does not ever receive anything from the central validation authority. The local server can then validate any certificate, giving no way for the central validation authority to revoke a certificate that once was valid.

This problem points out an additional item that must be dealt with by any authentication technique based on digital certificates. Some method must be created for revoking certificates that have expired, been canceled, or that have been rendered invalid by being broken by hackers. The prior art has dealt with this problem by creating and distributing certificate revocation lists (CRLs) to all local servers. A CRL is simply a list of the certificates which are no longer valid. Since the contents of these lists must be kept from being tampered with, they themselves must be cryptographically signed and validated by the local server creating yet another authentication issue. The distribution of these CRLs also creates a vulnerability because if a local server can be blocked from receiving a CRL, it might authenticate a client device that should be rejected.

Once a client device has been authenticated, a key exchange must take place to provide the client device with the key needed to decrypt the content. This task must also be accomplished in a secure fashion to ensure that no third party can intercept the key and use it to access content to which they are not entitled.

So there remains a need for an improved method of authenticating a client device in a way that does not require a connection to a central validation authority at the time the client device is authenticated, yet can still reliably deny permission to a client device that has had its rights revoked. This method should also put minimal computing and memory requirements client devices to enable them to be manufactured and sold at consumer price-points.

SUMMARY OF THE INVENTION

The present invention utilizes digital signatures stored in persistent memory on the client device to provide authentication and key exchange for digital media data streams or other digital content. Its resource and performance requirements are low enough to allow a client device to utilize even low-end consumer electronics chipsets as the "heavy-lifting" is performed at the server. It also provides a sophisticated, proactive revocation mechanism based on timestamps, yet even so, no connection to a third-party certificate validation authority is required at the time a client device is authorized to receive the content. The server accomplishes this by using freely distributed cryptographically signed group key files. Group key files are simply data files containing information used to authenticate a set of one or more digital certificates.

To initiate an authorization, the client device will send its digital certificate to the server. Included in the digital certificate is a ID identifying which group key file is associated with this digital certificate. Each digital certificate is associated with a single specific group key file, but one group key file can be associated with any number of digital certificates with equivalent rights to content. Group key files also include an expiration timestamp that is used as a part of the revocation mechanism. Group key files are regularly updated with new expiration timestamps and freely distributed by a central authority. While it will be a matter of policy by the content owner using a particular group key file, it is anticipated that in most cases, the expiration timestamp of a group key file will be only 3-4 weeks in duration. This means that if a particular group key is hacked (or a specific client device is somehow replicated en-masse), all that needs to be done is to stop updating that group key file. Then only the content that pre-dates the issuance of the last version of that group key file is compromised.

This creates the need for regular updates to the group key files. A central validation authority will have the responsibility to continually re-issue group key files 1-2 weeks before the previous version expires. Each server will be required to regularly check through its library of group key files to see which ones are approaching expiration. It will then need to go a find new version of each group key file which is less than 1 week from expiration. Again, since these files are small, the server could connect and download them over the internet during a server's next internet connection without appreciable impact on server performance even if the server's internet connection is quite slow.

The server can cache group key files or get the group key file when it is first requested by a client device. Once the server has a group key file, it can regularly check for updates over the internet to insure that the most recent version of the group key file is available when it is next requested. Because many digital certificates can be associated with a single group key file, the total number of group key files will be relatively small allowing the server to pre-fetch group key files even before a client device indicates their need for it. Even if the server does not pre-fetch group key files, after the very first time a client device is authenticated by the server, the server will have the proper group key file and can keep it updated. This lets the server validate the client device even if no current connection to the internet is available.

A section of the group key file containing the group key modulus is encrypted using the RSA public key infrastructure algorithm with a private key known only to the central authority and a fixed modulus. The private key and modulus used are the same for all group key files. The public key, P0, is built into the server software so that it can decrypt the encrypted section of all group key files. It is important to note, that even if this key becomes known to hackers, it will do them no good because it does not give them the ability to generate their own group key files or digital certificates. It is important for the server software to be configured in such a way that if a hacker attempts to change the integrated RSA public key, P0, the attempt will be detected and the software will not operate properly. This requires the server software to utilize code obfuscation techniques.

The digital certificates contain a cloaked section which is encrypted using the RSA algorithm with a group private key and group modulus when the digital certificate is created. Each group private key and modulus are chosen so that the group public key is also P0. So when the client device sends its digital certificate to the server, the server software can decrypt the cloaked section of the digital certificate using P0 and the group key modulus which was recovered from the encrypted section of the group key file. The cloaked section of the digital certificate contains the client key modulus, which along with the client public key included in the public section of the digital certificate, can be used to encrypt a set of session keys, Kka0, Kka1 & Kp using the RSA algorithm. The encrypted session keys are then sent back to the client device. The client device can then decrypt the session keys using the client private key and client key modulus which it has stored in non-volatile memory.

Once the session key has been exchanged, the server starts sending keep-alive messages to the client device every 5 seconds. The keep-alive messages consist of a random number and an incrementing counter value encrypted with one of the session keys, Kka0. Each time the client device receives a keep-alive message, it decodes it using Kka0, and examines the counter value to insure that it has not missed more than 5 consecutive keep-alive messages. If the counter value is valid, it takes the random number and counter value it received in the keep-alive message, encrypts it with Kka1, and sends it back to the server. The server then decrypts the keep-alive acknowledgement and examines the random number and counter value to make sure they are valid. If at any time, either the server or client device detects too many missing messages or an invalid message, it will terminate the session.

Once a session is established, the client device can request specific content from the server. The server then recovers an issuance timestamp associated with the content and compares that to the expiration timestamp of the group key file associated with the digital certificate of the client device. If the issuance timestamp is later then the expiration timestamp, the server declines the client device's request and does not allow the content to be delivered to the client device. If the issuance timestamp is earlier than the expiration timestamp, then the client device is allowed to receive the content. This is the proactive revocation that avoids the problems with distribution of certificate revocation lists. The server must regularly update the group key files it has cached to keep them up-to-date. Blocking this process is counter-productive as any new content will not work with an old group key file. Of course, traditional methods, such as revocation lists, can also be used in conjunction with the present invention to invalidate a specific group key file but, as with all such methods, they can be defeated by blocking the server's attempt to find out if a new version of the file is available. Using an expiration timestamp gives a much more proactive ability to revoke a particular group key file than traditional methods.

When the server is ready to send the content to the client device, it first must send the program key to the client device. In the preferred embodiment, either the M6 or AES algorithm can be used to encrypt the content based on the capability of the client device as indicated in the digital certificate although many other encryption algorithms could be used. The content may be pre-encrypted on the server, or the server may encrypt the content on the fly. In either case the program key used for the encryption process is encrypted using the Kp session key and sent to the client device. The client device then can use the program key to decrypt the content and present it to the user.

At the end of the content, the session can continue to be kept alive as long as the keep-alive messages are maintained. Either the client device or the server can terminate the session at any time, but if a session is terminated in the middle of sending content, the transmission of that content must be terminated as well.

DETAILED DESCRIPTION OF THE INVENTION

Reference will now be made to the accompanying drawings to further describe the preferred embodiment of the present invention. While the invention will be described in light of the preferred embodiment, it will be understood that it is not intended to limit the invention to those embodiments. The invention is intended to cover all modifications, alternatives or equivalents which may included within the spirit or scope of the invention as defined by the appended claims.

The following detailed descriptions give many specific details in order to provide a thorough understanding of the present invention. It will be recognized by one of ordinary skill in the art that the present invention may be practiced without those specific details. In other cases, well known methods, processes and techniques have not been described in detail so as not to obscure aspects of the present invention.

Figure 1:
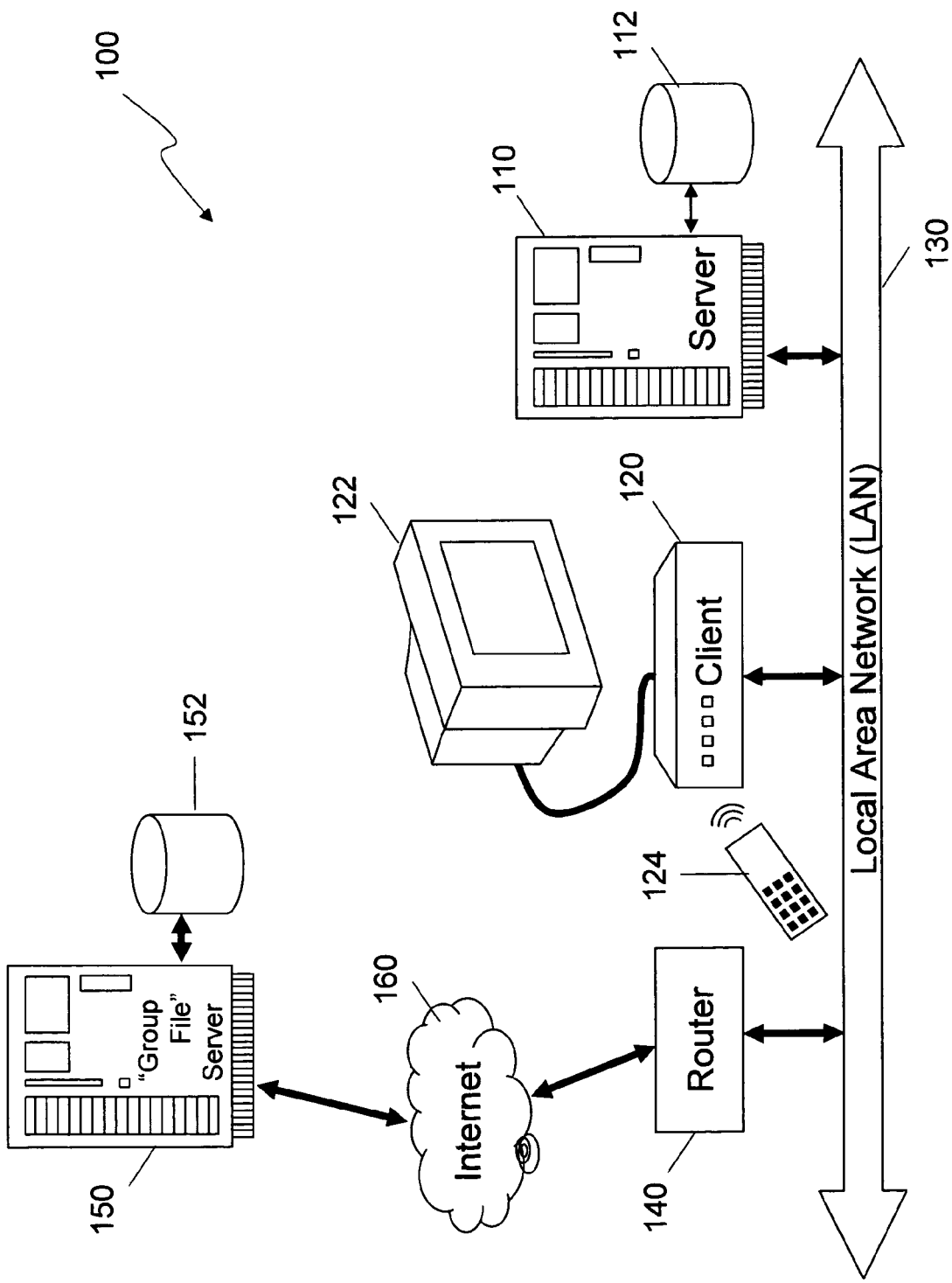
FIG. 1 is a block diagram of an exemplary networking environment suitable for use in the present invention.

FIG. 1 illustrates a network computing environment 100 in which aspects of the invention are implemented. A client device 120 and server 110 communicate over a network 130. In the preferred embodiment, the network is a local area network using TCP/IP protocol over Ethernet but the network 130 may comprise any class of network known in the art (e.g., the Internet, an Intranet, a Wide Area Network (WAN), Local Area Network (LAN), Storage Area Network (SAN), etc.) any physical network interface (e.g. Ethernet, 802.11 Wireless networking, HPNA, HomePlug, IEEE-1394, etc.) and any network communication protocol (e.g., TCP/IP, UDP/IP, RTP, HTTP, RTSP, SSL, etc.). The server 110 includes storage 112 which may be any type of non-volatile storage known in the art (e.g. hard disk drive, an array of hard disk drives, optical disk, non-volatile semiconductor memory, etc.) that can be used to store application programs, data files, digital media content, etc.

The client device 120 includes a user output device 122 such as an audio/video display device 122. In other embodiments, the user output device 122 could be an audio only output such as speakers or display only device such as an LCD panel. The client device 120 also includes a user input device 124 such as one or more of an IR remote control, keyboard, mouse, front-panel buttons, etc. which an be used by the user to initiate client device 120 accesses to data on the server 110 and control the client device 120.

The client device 120 and server 110 may comprise any computational device known in the art, such as a workstation, personal computer, server, laptop, hand held computer, telephony device, network appliance, etc. Further, there may be multiple client devices capable of communicating with the server 120 over the network 130 that include the components and capabilities described with respect to the client device 120.

A router 140 gives the client device 120 and server 110 access to other servers including a group key file server 150 over the internet 160. Depending on the exact type of network 130 being used and the specific topology of the network configuration created, the server 110 could access the group key file server 150 directly over the network 130, through a direct connection from the server 100 to the internet 160 or other ways without utilizing the router 140. A group key file server 150 includes storage 152 which can be used by the group key file server 150 to store applications and data files.

Figure 2:
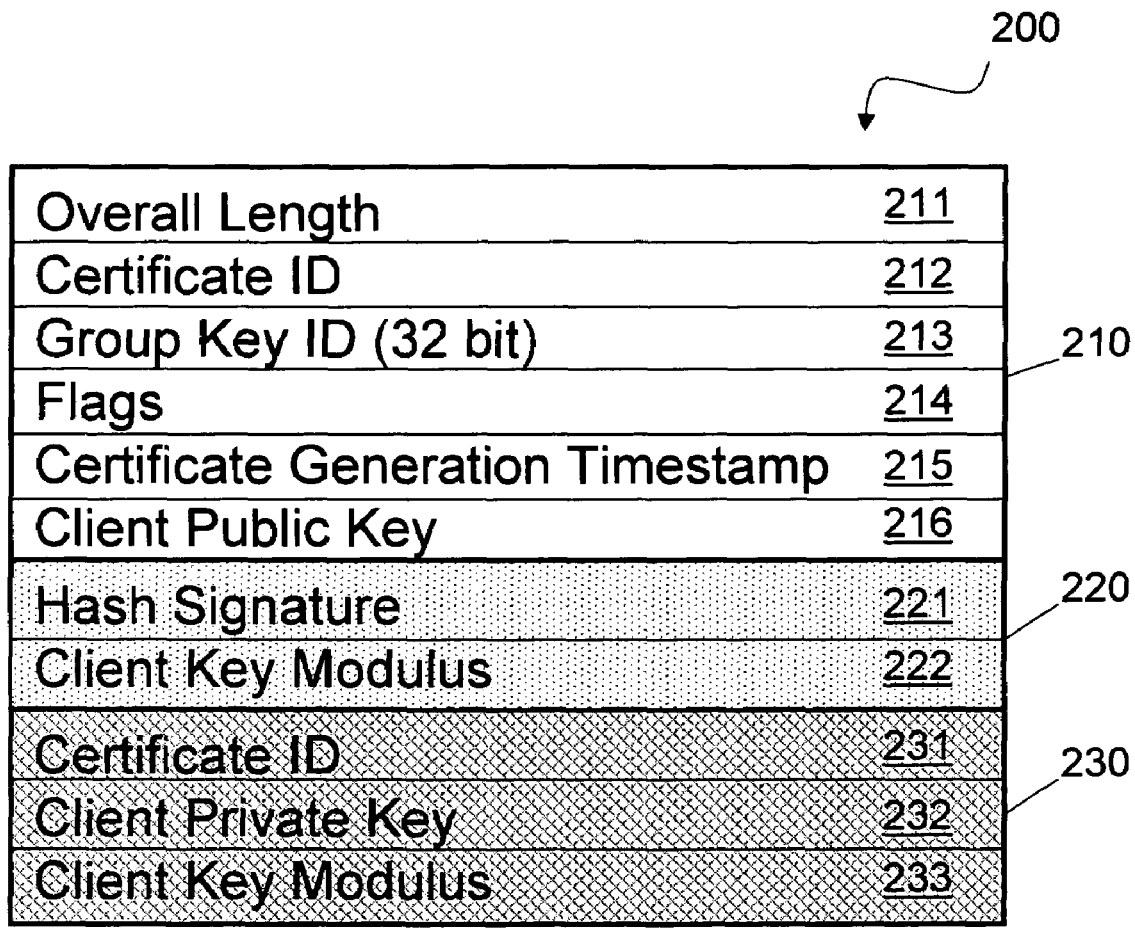
FIG. 2 is a representation of an exemplary digital certificate as would be contained in a client device in the present invention.
Figure 3:
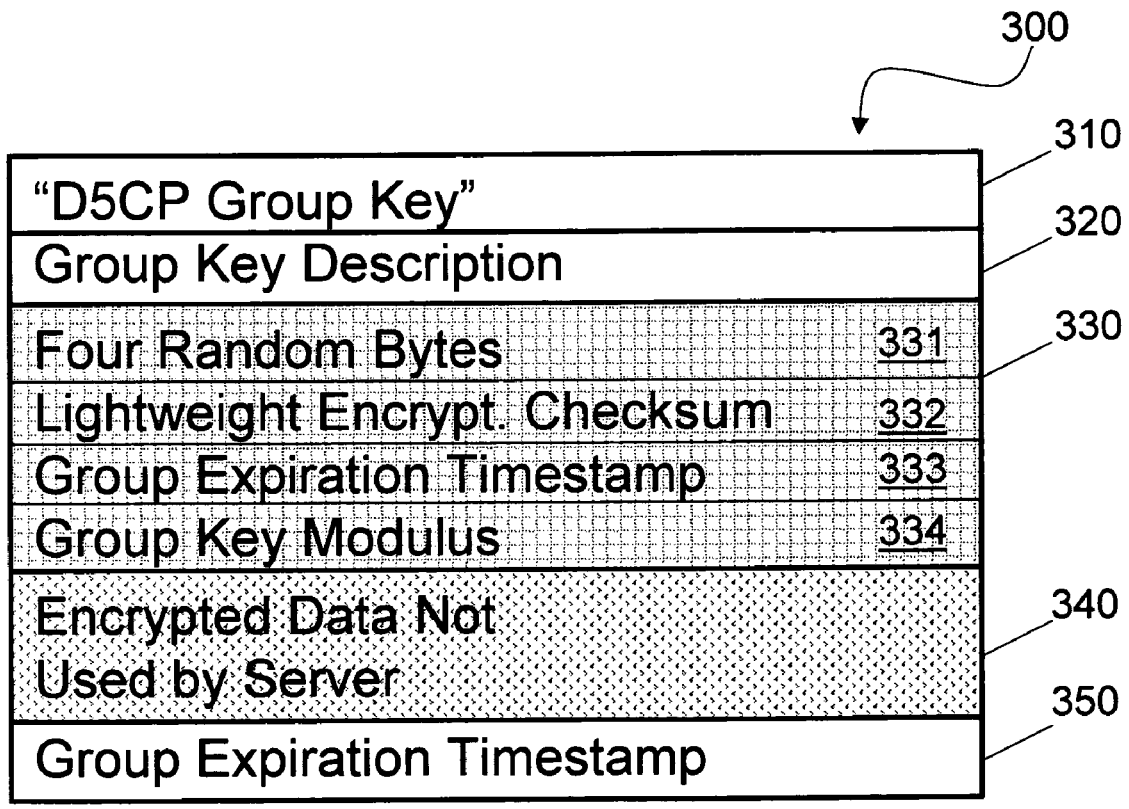
FIG. 3 is a representation of an exemplary group key file as would be used by a server in the present invention.

Referring now to FIG. 2 and 3, each client device 120 in accordance with the present invention contains a digital certificate 200 which is stored in non-volatile memory. The digital certificate 200 will be used by the server 110 to authenticate the client device 120. In many cases the digital certificate 200 is downloaded into the client device 120 at the time of manufacture. In other cases, the digital certificate 200 may be installed into the client device 120 when the user subscribes to a new service. The digital certificate 200, in the preferred embodiment, is comprised of three sections. The public section 210 is unencrypted. The cloaked section 220 is encrypted. The private section 230 is stored in a tamper-resistant way and is never revealed by the client device 120 to the server 110 or any other device.

In the preferred embodiment, the public section 210 is comprised of several independent fields. The Overall Length 211 gives the combined length of all three sections in bytes. The Certificate ID 212 is a unique number for each instance of the digital certificate 200. No two digital certificates according to the present invention will have the same Certificate ID 212. The Group Key ID 213 is a tag that identifies which group key file 300 should be used to validate the digital certificate 200. In the preferred embodiment, the Group Key ID 213 directly identifies the file name of the group key file 300. The 32 bit Group Key ID 213 value is converted to an eight ASCII character representation of the hexadecimal value which is used as the file name of the group key file 300. Flags 214 can be used to indicate certain information about the digital certificate 200 such as which type of encryption should be used to encrypt content after authentication is complete. The Certificate Generation Timestamp 215 gives the value of the expiration timestamp 333 of the particular version of the group key file 300 that was used to generate this digital certificate 200. And the Client Public Key 216 is the public key that should be used (along with the Client Key Modulus 222 in the cloaked section 220) to encrypt the session keys sent to the client device during the authentication process.

The cloaked section 220 is encrypted when the digital certificate 200 is created before it is downloaded into the client device 120. The encryption is performed using the private key of a public key infrastructure (PKI) key set specific to the group associated with this particular digital certificate 200. In the preferred embodiment, the PKI algorithm used is RSA but other types of encryption could be used. The cloaked section 220 has two fields in the preferred embodiment. The Hash Signature 221 is a cryptographic digest of the public section 210 and the unencrypted data of the cloaked section 220 of the digital certificate 200. The Hash Signature 221 provides a method to validate that the digital certificate 200 has not been tampered with. In the preferred embodiment, the Secure Hash Algorithm (SHA-1) is used to compute the Hash Signature 221. SHA-1 is defined by the Federal Information Processing Standards Publication 180-1 published Apr. 17, 1995. The second field is the Client Key Modulus 222. It is the modulus to be used, along with the Client Public Key 216, to encrypt the session keys.

The private section 230 contains information used internally to the client device 120. The private section 230 contains another copy of the Certificate ID 231. This is the same ID as is included in the public section 210 Certificate ID 212 and can be used by the client device 120 to ensure that the proper private section 230 is associated with the public section 210 and cloaked section 220 allowing the client device 120 some alternatives as to how the private section 230 is stored in a tamper resistant way. The Client Private Key 232 is used by the client device 120, along with the Client Key Modulus 233 to decrypt the session key which is encrypted with the Client Public Key 216. Even though the Client Private Modulus 232 is the same value as the copy of the Client Private Modulus 222 stored in the cloaked section 220, it must be stored in the private section 230 because the client device 120 does not have the key to decode the cloaked section 220.

It is understood that some implementations may include additional information in the digital certificate 200 while others may not include some of the structures described herein. Such changes can be made by one skilled in the art without departing from the spirit and scope of the present invention.

FIG. 3 shows the structure of a group key file 300. A group key file 300 is comprised of several sections separated by an ASCII CR/LF. The first section 310 consists of the ASCII string of "D5CP Group Key" to identify this file as a group key file 300 of the present invention. The second section 320 is an ASCII string that can be used as a comment. There are no restrictions on the content of the string except that the only CR/LF characters must come at the end and the length may not exceed a predetermined value, 256 bytes in the preferred embodiment. The third section 330 is an ASCII hexadecimal representation of encrypted data and will be described in more detail following. The fourth section 340 contains an ASCII hexadecimal representation of a different set of encrypted data that is not used by the server 110. It is used during the generation of digital certificates associated with the particular group key file 300. The final section contains the Group Expiration Timestamp 350. This value, represented as a string of ASCII hexadecimal digits, gives the time that the group key file 300 was generated as the number of minutes after midnight, Jan. 1, 1970. It is the same value as represented inside the encrypted section 330 but the clear text version can be used to quickly check on the expiration date of the group key file 300.

The encrypted section 330 is built up from two pieces, the Group Expiration Timestamp 333 and the Group Key Modulus 334. The Group Expiration Timestamp 333 gives the number of minutes since midnight, Jan. 1, 1970, which has the same time as the unencrypted Group Expiration Timestamp 350, but represented as a 31 bit binary number. The encrypted version will be used for all authentication purposes. The Group Key Modulus 334 is a 218 byte binary number in the preferred embodiment. It will retain the same value for a given group key file 330 each time it is updated with a later Group Expiration Timestamp 333. A lightweight encryption of the two fields is done first using CRC-32 with a reflected polynomial 0x04C11DB7, along with the initial mask of 0xFFFFFFFF (this is the same parameter set used by FDDI and Ethernet). Four Random Bytes 331 are generated in such a way that the most significant bit is a zero and used to initialize the CRC accumulator. Then for each subsequent byte of the Expiration Timestamp 333 appended to the Group Key Modulus 334, the byte is stored in a temporary buffer. The four bytes of the CRC accumulator are summed modulo 256 and XORed with the original data to encrypt it. The original byte stored in the temporary buffer is then merged into the CRC accumulator. At the end of this procedure, the value remaining in the CRC accumulator is used as the Lightweight Encryption Checksum 332.

The final step of the encryption of the encrypted section 330 of the group key file 300 is to use RSA encryption on the data block consisting of the Four Random Bytes 331, the Lightweight Encryption Checksum 332, the lightweight encrypted version of the Group Expiration Timestamp 333 and the lightweight encrypted version of the Group Key Modulus 334. The RSA encryption will be performed using a private key known only to the central validation authority with responsibility to create group key files and a modulus M0 which is the same for all group key files. The output of the RSA encryption is then converted to a ASCII string of hexadecimal digits and used as the encrypted section 330 of the group file 300.

Figure 4:
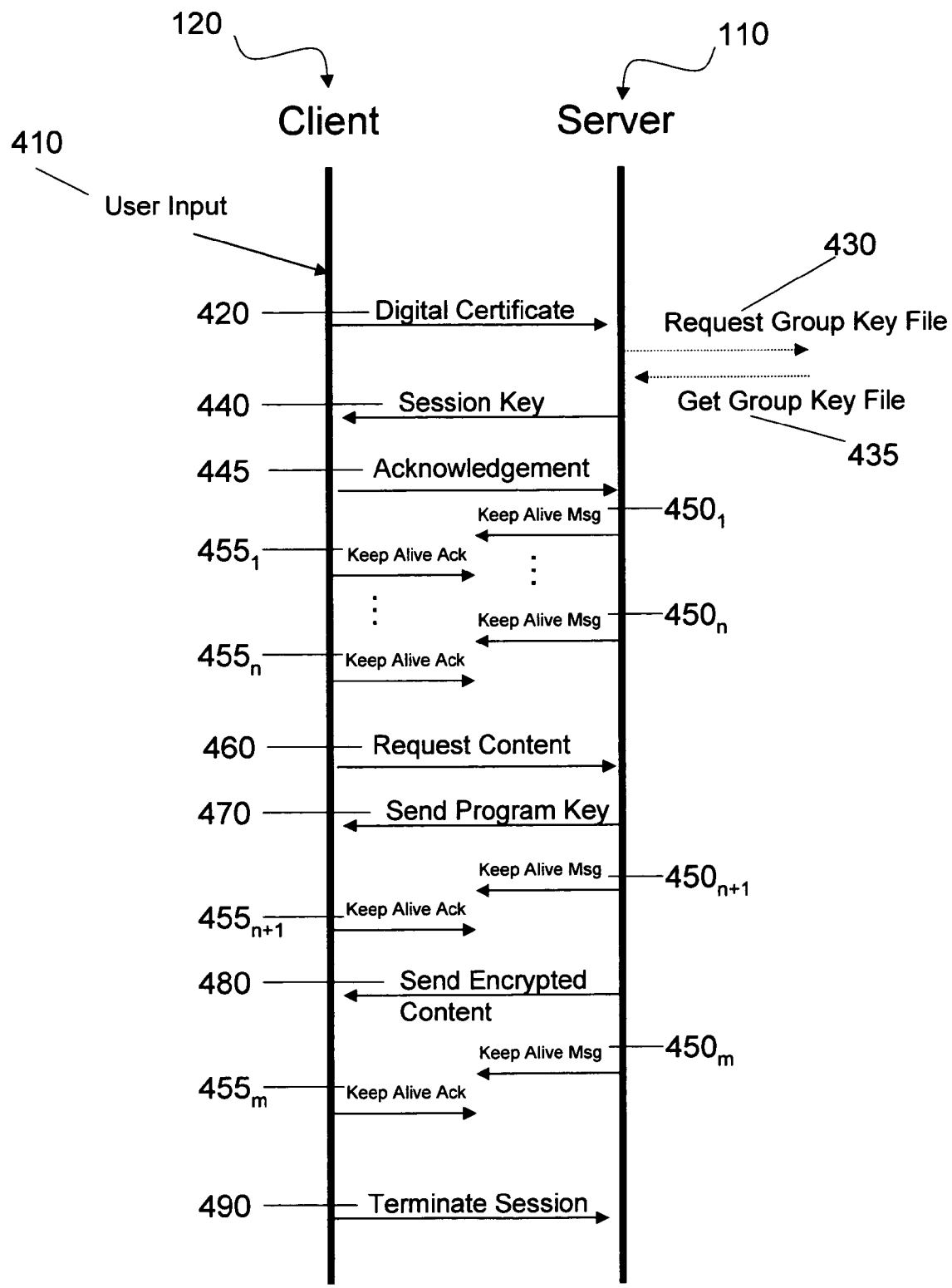
FIG. 4 is a representation of the interaction between a client device and a server over a network in the present invention.

An overall view of the interaction between a client device 120 and a server 110 of the present invention is shown in FIG. 4. This diagram is meant to show the external behavior of the devices, not their inner workings which will be described using other figures. Generally, the process will be started by a user providing input 410 to the client device 120 using a remote control 124 or some other user input means. To initiate an authorization, the client device 120 sends the public and cloaked sections of its digital certificate 200 in message 420 to the server 110. The server 110 will then extract the Group Key ID 213 from the public section 210 of the digital certificate 200 and look for a file with that name on the server's hard drive 112. If no file by that name is found, the server 110 will attempt to download the proper group key file 300 by connecting to another server 150 over the internet 160 and requesting the proper group key file 300 in message 430. The other server 150 could be at a single pre-determined URL or it could be selected from a list of several possible URL or FTP sites. The latest copy of the requested group key file 300 will then be downloaded in message 435 to the server 110 and stored on the server's hard drive 112.

Once the server 100 has validated both the digital certificate 200 and the group key file 300, it will generate a set of session keys (N0, Kka0, Kka1 and Kp) which are then encrypted and sent in message 440 to the client device 120. In the preferred embodiment, the session keys are encrypted using the RSA algorithm with the client public key 216 and client key modulus 222 from the digital certificate 200. The client device 120 then must decrypt the session keys and save them for use during the rest of the session that has just been initiated starting with the client device 120 sending its digital certificate 200 in message 420 to the server 110. Note that this is the only time that the client device 120 must do a full RSA operation. The RSA algorithm requires a significant amount of computation so it is important that a client device 120 not be required to do many RSA operations and for the few it is required to perform, it is important that there not be critical timing constraints. This allows the client device 120 to be built with much lower performance CPUs and smaller memory requirements than if many RSA operations with critical timing constraints had to be performed. The client device 120 then send an acknowledgement to the server 110 in message 445 to indicate that a valid session has been established. This message 445 consists of N0, which was received from the server, encrypted with Kp. If the message 445 as received by the server 110 is valid, a valid session has been established by the server 110.

Once a session has been established, the server 110 sends regular Keep-Alive Messages 450 to the client device 120. In the preferred embodiment, a Keep-Alive Message 450 is sent approximately every 5 seconds. A Keep-Alive Message 450 consists of a incrementing counter value and a random number encrypted using M6 with the session key Kka0. Each time the client device receives a Keep-Alive Message 450, it decrypts it using Kka0, and examines the counter value to insure that it has not missed more than 5 consecutive Keep-Alive Messages 450. If the counter value is valid, the client device 120 takes the random number and counter value it received in the Keep-Alive Message 450, encrypts it with Kka1 using M6 encryption, and sends it back to the server 110 as a Keep-Alive Acknowledgement 455. The server 110 then decrypts the Keep-Alive Acknowledgement 455 and examines the random number and counter value to make sure they are valid. If at any time, either the server 110 or client device 120 detects too many missing messages or an invalid message, it will terminate the session.

If there is an active session, the client device 120 is able to request protected content from the server 110 in message 460. The server 110 will determine if the client device 120 is authorized to receive that content using information extracted from the client device's digital certificate 200 which it received in message 420, information from the associated group key file 300 received in message 435, and information attached to the content. If the client device 120 is allowed to receive the content requested in message 460, the server 110 will send the program key associated with that content to the client device 120. The program key is encrypted with session key Kp and sent in message 470. Then the server 110 will begin sending the content encrypted with the program key to the client device 120 in transmission 480. It will be noted that the Keep-Alive Messages 450 and Keep-Alive Acknowledgements 455 continue during the transmission of encrypted content 480.

At the end of the transmission of the encrypted content 480, the session can continue to be kept alive as long as the Keep-Alive Messages 450 and Keep-Alive Acknowledgements 455 continue. Either the client device 120 or the server 110 can terminate the session at any time, but if a session is terminated during the transmission of the encrypted content 480, the transmission of the encrypted content 480 must be terminated as well. Message 490 shows the client device 120 terminating the session.

FIG. 5A-5D show the method used by the server 100 to authorize a client device 120, provide the client device 120 with the necessary session key, and establish a session. Starting with FIG. 5A, process 500 describes how a group key file 300 is validated. At 501 the server receives the public and cloaked sections of the client device's digital certificate 200 from the client device 120. At 502, the server 110 extracts the Group Key ID 213 from the public section 210 of the digital certificate 200 and converts that 32 bit field into an eight character representation of the hexadecimal value. The server 110 looks for a file with that name in a pre-determined location on the server's hard drive 112 at 503. After evaluating the results of the search at 504, the server 110 will download the appropriate group key file 300 from the remote server 150 if necessary at 505. Once the proper group key file 300 has been located, it is read by the server 110 and the encrypted section 330 is decrypted as described following.

The decryption of the encrypted section 330 of the group key file 300 is performed by first using the RSA algorithm with P0 as the public key and M0 as the modulus at 506. P0 and M0 are the same for all group key files. It is important to note, that even if these keys becomes known to hackers, it will do them no good because it does not give them the ability to generate their own group key files or digital certificates. It is important for the server software to be configured in such a way that if a hacker attempts to change the integrated RSA public key, P0, or modulus, M0, the attempt will be detected and the software will not operate properly. This requires the server software to utilize code obfuscation techniques such as generated by Cloakware™ or other such tools. After the RSA algorithm has been completed, the result must be lightweight decrypted at 507. This is accomplished using CRC-32 with a reflected polynomial 0x04C11DB7, along with the initial mask of 0xFFFFFFFF (this is the same parameter set used by FDDI and Ethernet). The first four bytes of the results of the RSA decryption (which are the Four Random Bytes 331 that were used for the encryption) are used to initialize the CRC accumulator. The next four bytes of the results of the RSA decryption are then set aside to compare to the checksum output of the decryption process. Then for each subsequent byte of the remaining RSA decryption output, the four bytes of the CRC accumulator are summed modulo 256 and XORed with the data to lightweight decrypt it. Then the decrypted byte is merged into the CRC accumulator. After all the data has been decrypted, at 508 the value remaining in the CRC accumulator is compared against the checksum that was set aside. If the checksums to not match, the group key file 300 is invalid and the client device 120 is declined at 509. If the checksums do match, the group key file 300 is valid and process 510 is started which validates the digital certificate 200.

Figure 5A:
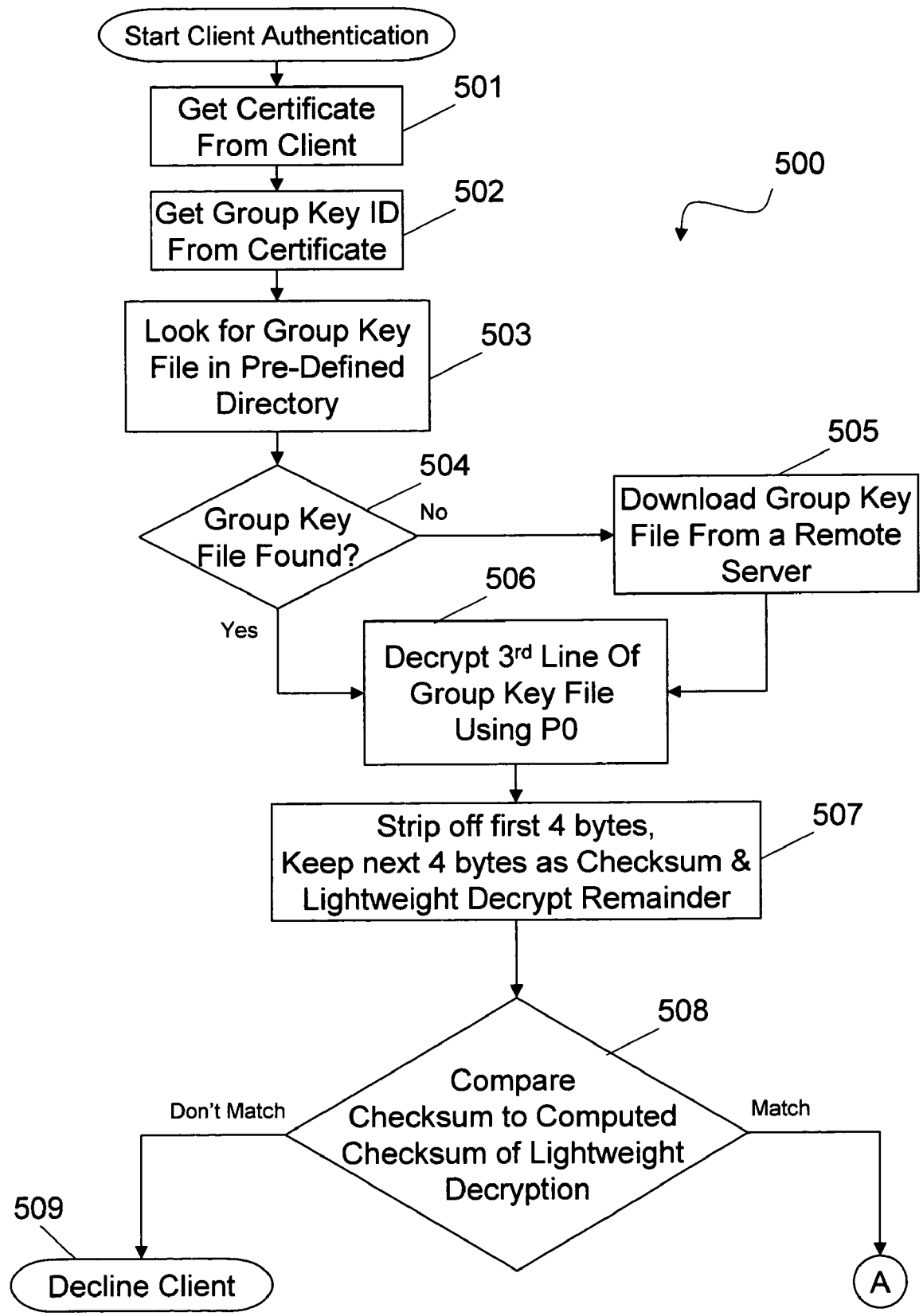
FIG. 5A is a flow-chart diagram useful in describing group key file validation as performed in the present invention.
Figure 5B:
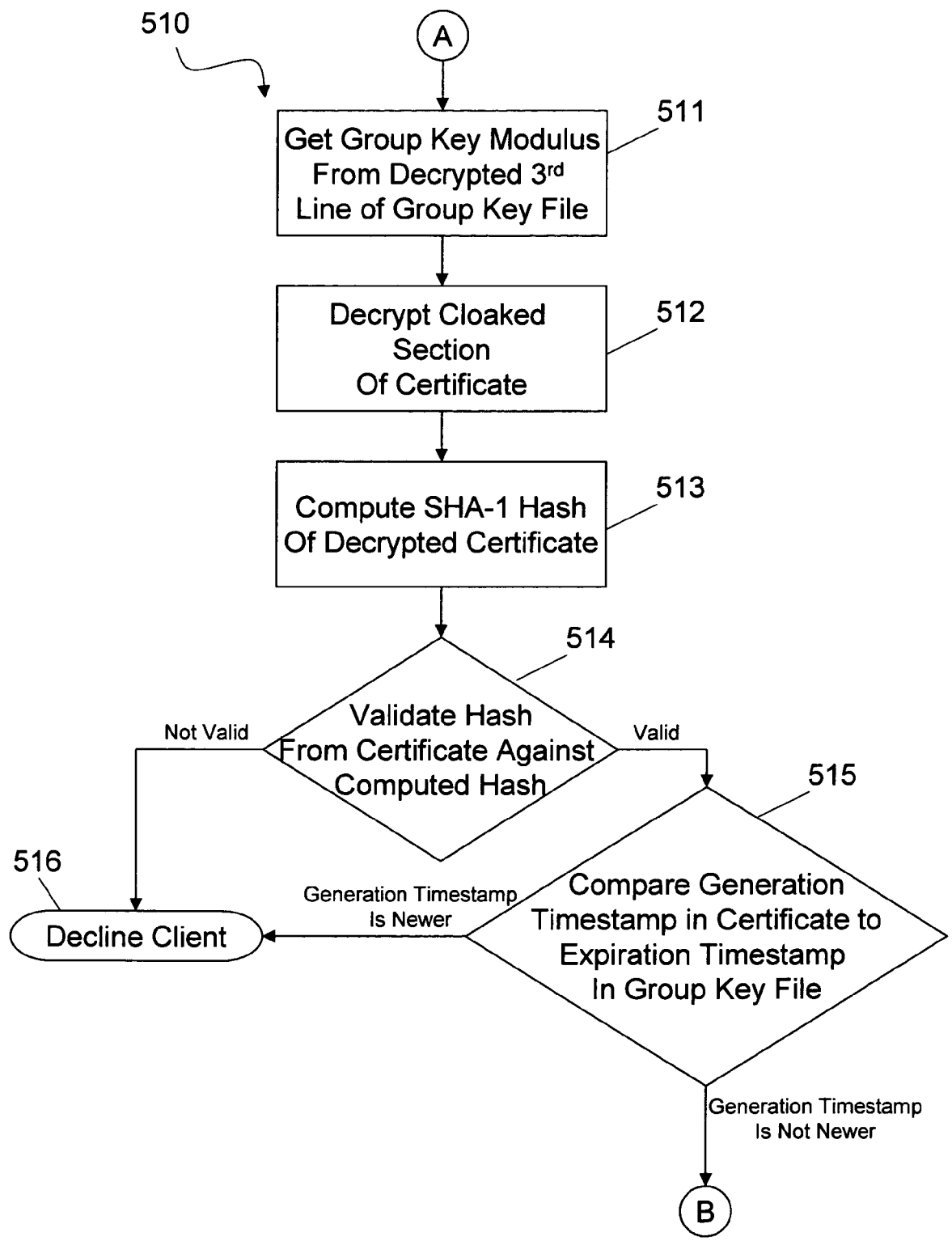
FIG. 5B is a flow-chart diagram useful in describing digital certificate validation as performed in the present invention.

At 511 in FIG. 5B, the server 120 retrieves the Group Key Modulus 334 which was decrypted at 507. Then at 512 the RSA algorithm is used with P0 as the public key and the Group Key Modulus 334 as the modulus to decrypt the cloaked section 230 of the digital certificate 200. To verify the validity of the digital certificate 200, at 513 the SHA-1 hash signature is created of the public section 210 and newly decrypted cloaked section 220 of the digital certificate 200. The newly computed hash signature is compared to the decrypted Hash Signature 221 at 514. If they do not match, the digital certificate 200 is not valid and the client device 120 is declined at 516. If the hash signatures match, the Certificate Generation Timestamp 215 of the digital certificate 200 is compared to the decrypted Group Expiration Timestamp 333 of the group key file 300. If the Group Expiration Timestamp 333 is an earlier time than the Certificate Generation Timestamp 215, it can be assumed that the group key file 300 is out of date and the client device 120 is declined at 516. If the Group Expiration Timestamp 333 is an equal or later time than the Certificate Generation Timestamp 215, the digital certificate 200 is deemed valid and a session can be initiated as shown in process 520.

Figure 5C:
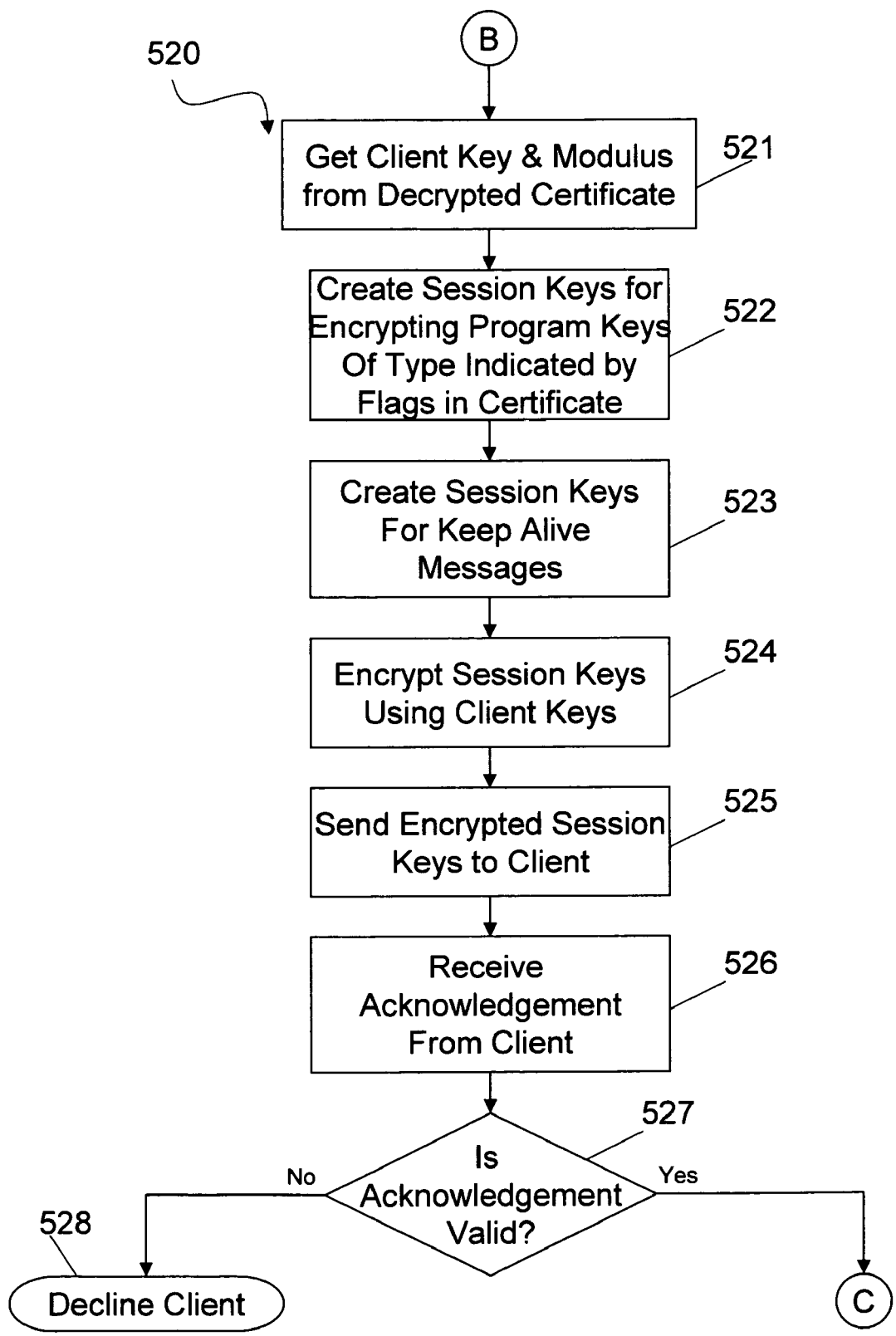
FIG. 5C is a flow-chart diagram useful in describing the initiation of a session between a client device and a server in the present invention.

In FIG. 5C, the server 110 recovers the Client Public Key 216 from the public section 210 and the Client Key Modulus 222 from the decrypted cloaked section 220 of the digital certificate 200 at 521. At 522 the server 110 generates a session key Kp and a 16 byte random number N0. The form of Kp will depend on the Flags 214 in the digital certificate 200. If the Flags 214 indicate that the client device 120 can perform AES decryption then Kp will be a 128 bit long AES key. If the Flags 214 indicate that the client device 120 can only perform M6 decryption, then Kp will be an eight-byte M6 key. The server 110 generates session keys Kka0 and Kka1 for the Keep-Alive Messages 450 at 523. Kka0 and Kka1 are eight-byte keys for use in the M6 algorithm. Then at 524, the server 110 encrypts the random number N0, and the session keys Kp, Kka0 and Kka1 using RSA utilizing the Client Public Key 216 and Client Key Modulus 222. At 525 the server sends the encrypted N0 and session keys to the client device 120 as message 440. When, at 526, the server 110 receives the acknowledgement message 445 from the client device 120, the server 110 decrypts the message 445 using Kp to recover the random number N0. If the decrypted N0 from message 445 does not match the N0 that was generated by the server 110, the acknowledgment message 445 is deemed invalid at 527 and the client device 120 is denied at 528. If the values match, the server 110 continues the session in process 530.

Figure 5D:
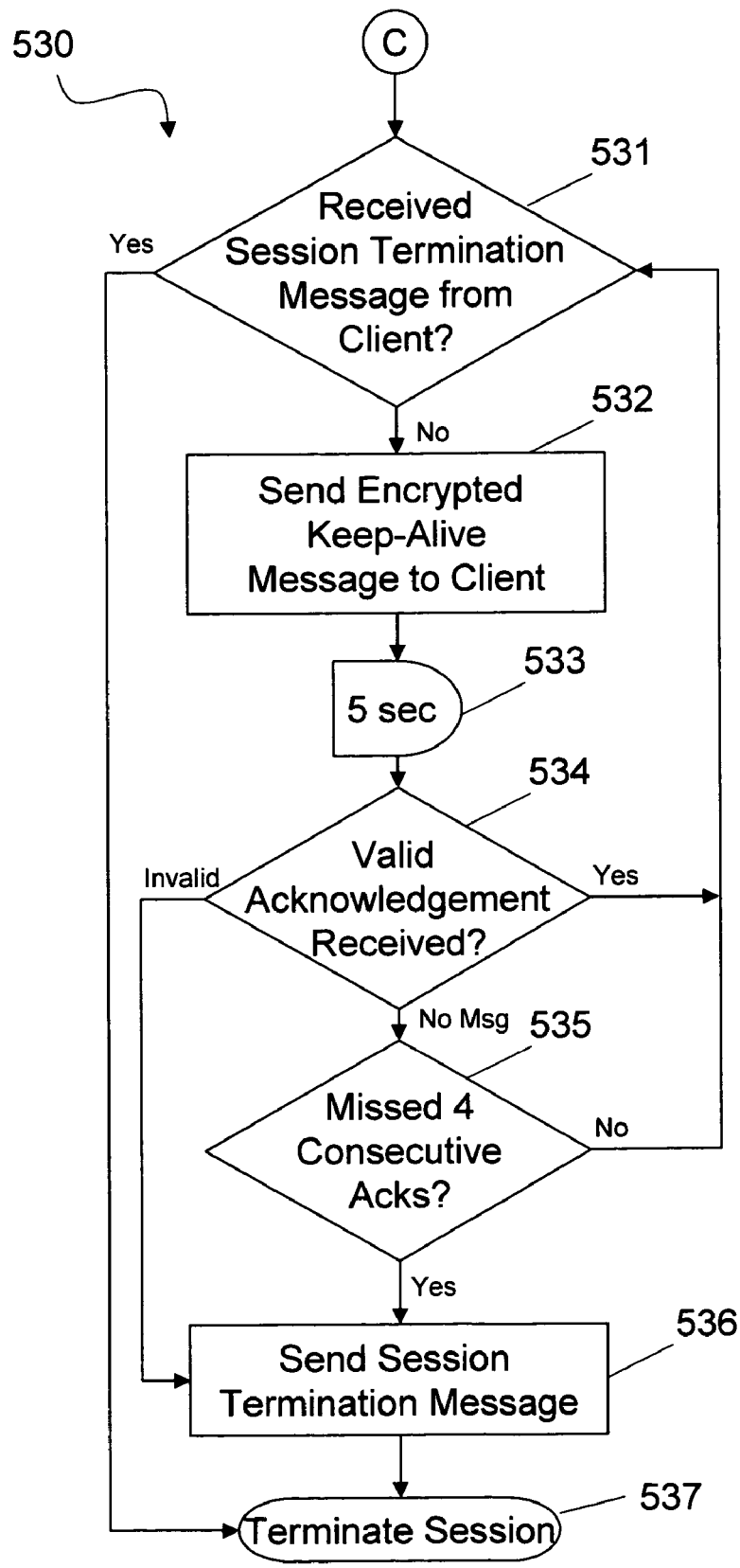
FIG. 5D is a flow-chart diagram useful in describing how a session is kept active in the present invention.

Looking now at FIG. 5D, the server 110 maintains the session using Keep-Alive Messages 450 as shown in process 530. If a termination message 490 is received at 531 the session is ended at 536. If no termination message 490 has been received, at 532 the server 110 sends a Keep-Alive Message 450 to the client device 120. A Keep-Alive Message 450 consists of a random number and an incrementing counter value encrypted with one of the session keys, Kka0, using the M6 encryption algorithm. Each Keep-Alive Message $450_n$ generates a new random number and increments the counter by one from the previous Keep-Alive Message $450_{n-1}$. The server 110 then waits 5 seconds at 533 looking for a Keep-Alive Acknowledgement Message 455 at 534. If no Keep-Alive Acknowledgement Message 455 is received in that time period, the server logs the fact that a Keep-Alive Acknowledgement Message 455 was missed. If four consecutive Keep-Alive Acknowledgement Messages $450_{n-3}$-$450_n$ are missed, as checked at 535, a session termination message is sent to the client device 120 at 536 and the session is terminated at 537. If a Keep-Alive Acknowledgement Message 455 is received, the server 110 decodes it using M6 with the Kka1 key. The server 100 then examines the random number and counter pair, comparing them against the values that were sent in the last five Keep-Alive Messages $450_{n-4}$-$450_n$ and if the received pair match one of the sent pairs, a the Keep Alive Acknowledgement Message 455 is deemed valid and process 530 branches back to 531. If the received pair does not match any of the last five sent pairs, the message is deemed invalid and the server 110 sends a session termination message to the client device 120 at 536 and the session is terminated at 537.

Figure 6:
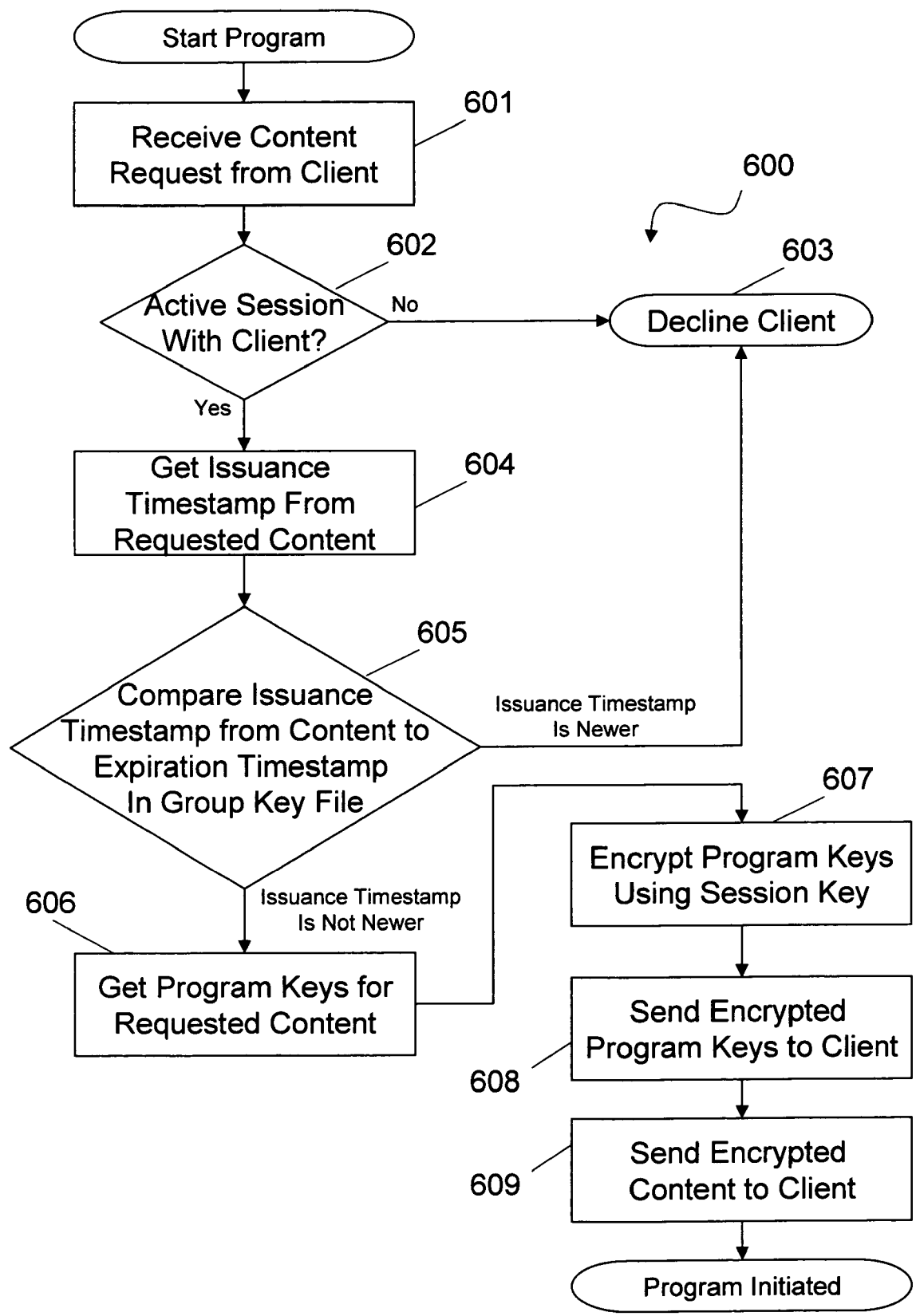
FIG. 6 is a flow-chart diagram useful in describing the exchange of a program key between a client device and a server in the present invention.

In FIG. 6, process 600 describes the program key exchange from the server 110 to the client device 120. The client device 120 sends a request for specific content to the server 110 at 601. The server 110 checks to make sure that a session is active with the client device 120 at 602 and if no active session is found, the client device 120 is declined at 603. If an active session is found, the server 110 finds the issuance timestamp for the content at 604. In the preferred embodiment, the issuance timestamp is embedded in the content in a tamper-resistant manner but it could be associated with the content in other ways. At 605 the server 110 compares the issuance timestamp of the requested content to the Group Expiration Timestamp 333 associated with the digital certificate 200 of the client device 120. If the issuance timestamp is after the Group Expiration Timestamp 333, the client device 120 is not authorized to receive the requested content and will be declined at 603. This illustrates the proactive revocation feature of the present invention. If, however, the issuance timestamp of the requested content is before the Group Expiration Timestamp 333, the client device 120 is authorized to receive the content. The server 110, at 606, then retrieves the program keys if the content is stored in an encrypted state or generates a program key that will be used to encrypt the program on-the-fly. The type of encryption supported by the client device 120 is given in the Flags field 214 of the digital certificate 200. The server 110 then encrypts the program key using the session key according to the type of encryption identified by the Flags field 214 at 607. At 608 the server 110 sends the encrypted program key to the client device 120. Then, at 609, the server 110 sends the encrypted content to the client device 120. The content can be either stored in an encrypted state on the server's hard drive 112 or stored in the clear. If the content is stored in the clear, the server 110 must encrypt the content with the program key before sending it to the client device 120.

Figure 7:
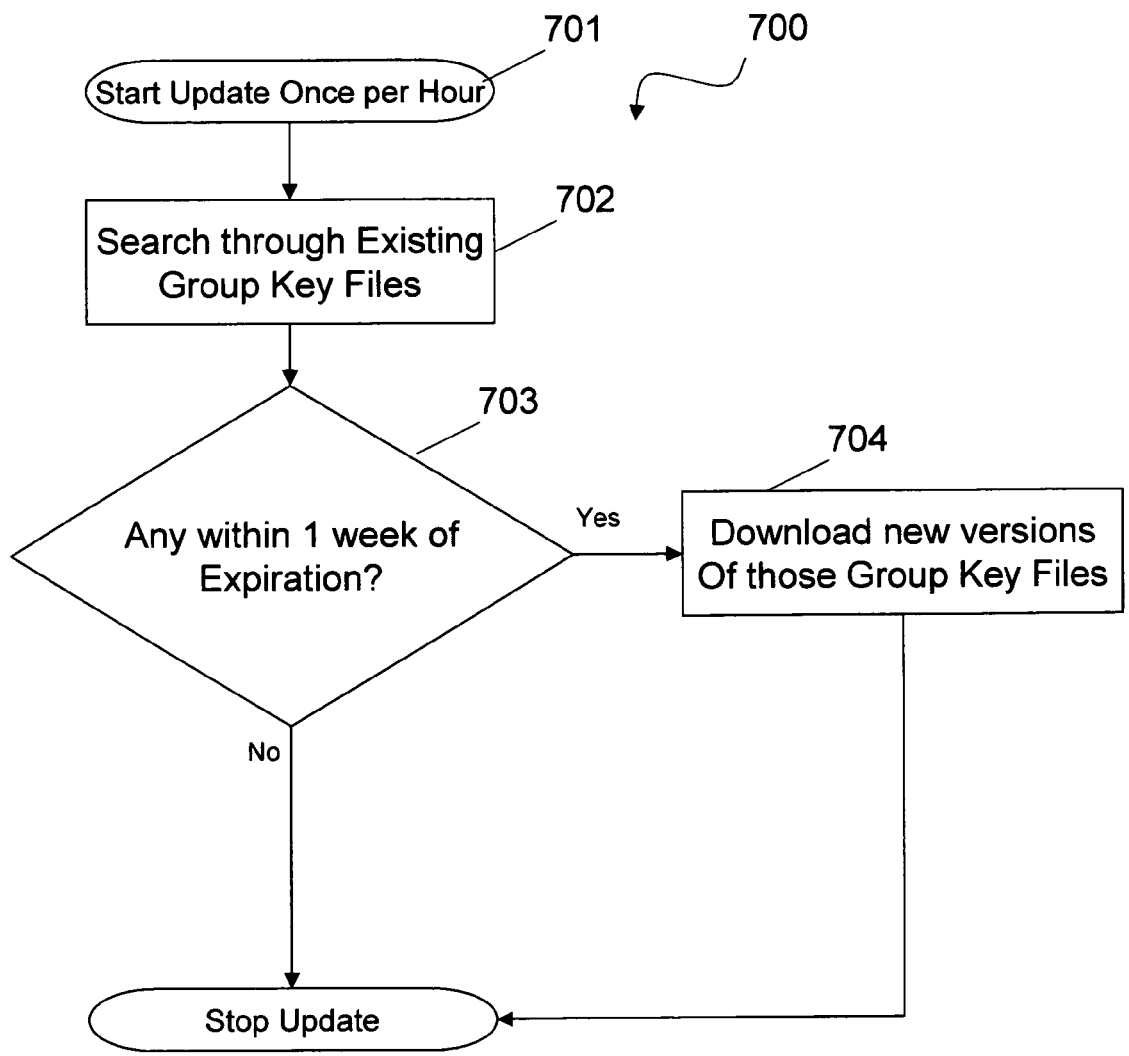
FIG. 7 is a flow-chart diagram useful in describing how a server keeps group key files updated in the present invention.

FIG. 7 shows process 700, the method used by the server 110 to keep the most recent copy of the group key file 300 available and waiting on the server's hard drive 112. Approximately once per hour, at 701, in the preferred embodiment, the server 110 will search through its cache of group key files to see which ones will be expiring soon. The unencrypted version of the Group Expiration Timestamp 350 can be used for this purpose. Any group key file expiring within the next week is put on an update list at 703. If there no group key files on the update list, process 700 ends until it is started up again in another hour. If there are files to be updated on the list, the server 110 attempts to download them from the remote server 150 at 704. Depending on the policy set up for the server 110, it might only download the files if an active internet connection is available at that time. With that policy, the server 110 would wait to be connected to the internet for some other reason before downloading the files in need of updating. It could also have a policy that if the group key file is going to expire within 24 hours, to proactively connect to the internet to download the updated group key files on the list. This process 700 insures that the most recent group key file 300 is available on the server 110 whenever the client device 120 initiates an authorization so that even if there is no internet connection available at that time, the authorization can be completed.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The invention claimed is:

1. A method, comprising:
   receiving, at a server, a digital certificate from a client;
   obtaining a data file associated with the digital certificate;
   decrypting an encrypted section of the data file using a fixed key at the server to extract a group key;
   decrypting an encrypted section of the digital certificate to extract a client key using the group key; and
   sending a program key to the client after encrypting the program key using the client key.

2. The method according to claim 1 wherein obtaining the data file associated with the digital certificate comprises:
   extracting a group identifier from an unencrypted section of the digital certificate; and
   utilizing the group identifier to obtain the data file associated with the digital certificate.

3. The method according to claim 1 wherein obtaining the data file associated with the digital certificate comprises:

searching for the data file on at least a portion of a non-volatile computer readable memory device accessible to the server; and if the data file is not found on the non-volatile computer readable memory device, downloading the data file from another server.

4. The method according to claim 3 wherein searching for the data file on at least the portion of the non-volatile computer readable memory device comprises searching for the data file on at least one of a hard drive, an optical disk, or a non-volatile semiconductor memory based device.

5. The method according to claim 3 wherein searching for the data file on at least the portion of the non-volatile computer readable memory device searched comprises searching a folder of a file system implemented on the non-volatile computer readable memory device.

6. The method according to claim 3 further comprising downloading the data file from the other server over an internet connection.

7. The method according to claim 3 further comprising extracting an expiration date from the data file and downloading a newer data file if the expiration date is less than some predetermined period beyond the current time.

8. The method according to claim 1 further comprising associating the data file with at least one other digital certificate.

9. The method according to claim 1 wherein decrypting the encrypted section of the data file using the fixed key at the server to extract the group key further comprises determining that the group key came from an authorized source only if a computed checksum of the data file is the same as a checksum contained in the decrypted section of the data file.

10. The method according to claim 1 wherein decrypting the encrypted section of the data file using the fixed key at the server to extract the group key further comprises using a public key algorithm.

11. The method according to claim 1 wherein the fixed key is embedded in software running on the server in a way to make it difficult to change the fixed key and have the software still operate properly.

12. The method according to claim 1 wherein decrypting at the encrypted section of the digital certificate further comprises using a public key algorithm.

13. The method according to claim 1 further comprising determining if the digital certificate is valid by:
    calculating a hash signature of the decrypted section of the digital certificate; and
    determining that the digital certificate is valid only if the calculated hash signature is the same as a hash signature contained in the digital certificate.

14. The method according to claim 1 further comprising determining if the digital certificate is valid by:
    extracting an expiration timestamp from the data file;
    extracting a generation timestamp from the digital certificate; and
    determining that the digital certificate is valid only if the expiration timestamp from the data file is not earlier than the generation timestamp from the digital certificate.

15. The method according to claim 1 wherein if the client is authorized to receive the content, further comprising:
    generating a set of one or more session keys;
    encrypting the set of one or more session keys using the client key; and
    establishing a session with the client by sending the encrypted session keys to the client.

16. The method according to claim 15 wherein encrypting the set of one or more session keys using the client key further comprises using a public key algorithm.

17. The method according to claim 15 further comprising:
    sending keep-alive messages, encrypted with at least one session key, to the client; and
    receiving keep-alive acknowledgements, encrypted with at least one session key, from the client.

18. The method according to claim 17 further comprising encrypting the keep-alive messages with a different session key than the session key used to encrypt the keep-alive acknowledgements.

19. The method according to claim 17 further comprising terminating the session if either:
    an invalid keep-alive acknowledgement is received; or
    more than a predetermined number of the keep alive messages are sent without receiving the keep-alive acknowledgements.

20. The method according to claim 15 further comprising:
    sending specific content, encrypted using the program key, responsive to a request from the client.

21. A method for a server to authorize a client to receive specific content, comprising:
    receiving, at the server, a digital certificate from the client;
    obtaining a data file associated with the digital certificate;
    extracting a client key from an encrypted section of the digital certificate;
    extracting an expiration timestamp from the data file by decrypting the data file using a decryption key built into a set of instructions running on the server;
    sending a program key to the client after encrypting the program key using the client key;
    receiving, at the server, a request from the client device for the specific content;
    obtaining an issuance timestamp for the specific content requested by the client; and
    sending the specific content, encrypted using the program key, to the client only if the issuance timestamp is earlier than the expiration timestamp.

22. The method according to claim 21 wherein obtaining the data file associated with the digital certificate comprises:
    extracting a group identifier from the digital certificate;
    searching for the data file on at least a portion of a non-volatile computer readable memory device accessible to the server by utilizing the group identifier to indicate the name of the data file; and
    if the data file is not found on the non-volatile computer readable memory device, downloading the data file from another server.

23. The method according to claim 22 further comprising keeping the data file up-to-date by periodically downloading a newer version of the data file from the another server and replacing the data file with the newer version of the data file.

24. The method according to claim 23 wherein periodically downloading the newer version of the data file occurs if the expiration date is less than some predetermined period beyond a current time.

25. The method according to claim 21 further comprising associating the data file with at least one other digital certificate.

26. The method according to claim 21 wherein extracting the expiration timestamp further comprises:
    determining that the data file is valid only if a computed checksum of the data file is the same as a checksum contained in the decrypted data file;
    extracting the expiration timestamp only if the data file is valid; and declining the client if the data file is not valid.

27. A system for sending protected digital content to authorized client devices comprising:
- a server;
- a set of computer instructions residing in computer memory being executed by the server;
- a non-volatile computer readable memory device accessible to the server;
- a network connection allowing the server to communicate on the network;
- a digital certificate comprising an unencrypted section and an encrypted section;
- a data file associated with the digital certificate comprising at least an encrypted section;
- a group identifier in the unencrypted section of the digital certificate;
- a group key in the encrypted section of the data file;
- a client key in the encrypted section of the digital certificate; and
- a program key utilized to access the protected content;
- wherein the set of computer instructions executing on the server perform a method comprising:
  - receiving the digital certificate over the network interface;
  - utilizing the group identifier to obtain the data file associated with the digital certificate;
  - decrypting the encrypted section of the data file utilizing a fixed key built into the set of computer instructions;
  - decrypting the encrypted section of the digital certificate utilizing the group key;
  - sending the program key, encrypted utilizing the client key, over the network interface; and
  - sending the protected digital content over the network interface.

28. A system according to claim 27 further comprising:
- an expiration timestamp in the data file;
- an issuance timestamp associated with the protected content; and
- wherein the set of computer instructions executing on the server perform the method further comprising sending the specific content to the client device only if the issuance timestamp is earlier than the expiration timestamp.

29. An article of manufacture comprising:
- a computer usable medium having computer readable program code embodied therein for authorizing a client comprising:
- computer readable program code configured to receive a digital certificate from the client;
- computer readable program code configured to obtain a data file associated with the digital certificate;
- computer readable program code configured to extract a group key from the data file by decrypting an encrypted section of the data file using a fixed key embedded in the computer readable program code;
- computer readable program code configured to extract a client key from the digital certificate by decrypting an encrypted section of the digital certificate using the group key;
- computer readable program code configured to encrypt one or more session keys using the client key; and
- computer readable program code configured to send the one or more session keys to the client after encrypting the one or more session keys using the client key.

30. An article of manufacture comprising:
- a computer usable medium having computer readable program code embodied therein for authorizing a client to receive specific content comprising:
- computer readable program code configured to receive a digital certificate from the client;
- computer readable program code configured to obtain a data file associated with the digital certificate;
- computer readable program code configured to extract an expiration timestamp from the data file by decrypting the data file using a decryption key built into a server;
- computer readable program code configured to send a program key to the client after encrypting the program key using a client key;
- computer readable program code configured to receive a request from the client for the specific content;
- computer readable program code configured to obtain an issuance timestamp for the specific content requested by the client; and
- computer readable program code configured to send the specific content, encrypted using the program key, to the client only if the issuance timestamp is earlier than the expiration timestamp.

31. The article of manufacture according to claim 30 further comprising:
- computer readable program code configured to extract a group identifier from the digital certificate;
- computer readable program code configured to search for the data file on at least a portion of a non-volatile computer readable memory device accessible to the server by utilizing the group identifier to indicate the name of the data file; and
- computer readable program code configured to download the data file from another server if the data file is not found on the non-volatile computer readable memory device.

32. An apparatus comprising a processor and a memory storing instructions that cause the processor to perform the operations of:
- receiving a digital certificate from a client;
- obtaining a data file associated with the digital certificate;
- extracting a client key from an encrypted section of the digital certificate;
- extracting an expiration timestamp from the data file by decrypting the data file using a decryption key built into the instructions running on the server;
- sending a program key to the client after encrypting the program key using the client key;
- receiving a request from the client device for the specific content;
- obtaining an issuance timestamp for the specific content requested by the client; and
- sending the specific content, encrypted using the program key, to the client only if the issuance timestamp is earlier than the expiration timestamp.

33. A method to configure a server with instructions to perform the operations of:
- receiving, at the server, a digital certificate from a client;
- obtaining a data file associated with the digital certificate;
- extracting a client key from an encrypted section of the digital certificate;
- extracting an expiration timestamp from the data file by decrypting the data file using a decryption key built into the instructions running on the server;
- sending a program key to the client after encrypting the program key using the client key;
- receiving, at the server, a request from the client device for the specific content;
- obtaining an issuance timestamp for the specific content requested by the client; and sending the specific content, encrypted using the program key, to the client only if the issuance timestamp is earlier than the expiration timestamp.

* * * * *